(12) United States Patent
Fujimoto

(10) Patent No.: US 9,030,568 B2
(45) Date of Patent: May 12, 2015

(54) DATA PROCESSING APPARATUSES, DATA PROCESSING METHOD, PROGRAM, AND CAMERA SYSTEM

(75) Inventor: Masakatsu Fujimoto, Kanagawa (JP)

(73) Assignee: Sony Corporation (JP)

( * ) Notice: Subject to any disclaimer, the term of this patent is extended or adjusted under 35 U.S.C. 154(b) by 523 days.

(21) Appl. No.: 13/414,868

(22) Filed: Mar. 8, 2012

(65) Prior Publication Data

US 2012/0257074 A1 Oct. 11, 2012

(30) Foreign Application Priority Data

Apr. 5, 2011 (JP) ................................. 2011-083811

(51) Int. Cl.
| | |
|---|---|
| *H04N 5/228* | (2006.01) |
| *H04N 9/04* | (2006.01) |
| *H04N 5/232* | (2006.01) |
| *H04N 19/593* | (2014.01) |
| *H04N 19/186* | (2014.01) |
| *H04N 19/184* | (2014.01) |
| *G06K 9/36* | (2006.01) |
| *G06K 9/46* | (2006.01) |

(52) U.S. Cl.
CPC ........... *H04N 9/045* (2013.01); *H04N 5/23229* (2013.01); *H04N 19/593* (2013.01); *H04N 19/186* (2013.01); *H04N 19/184* (2013.01)

(58) Field of Classification Search
CPC .................................. G06T 9/005; H04N 1/64
USPC ................................ 348/222.1; 382/166, 232
See application file for complete search history.

(56) References Cited

U.S. PATENT DOCUMENTS

2005/0141772 A1* 6/2005 Okada ........................... 382/238

FOREIGN PATENT DOCUMENTS

JP 2003-224868 8/2003

* cited by examiner

*Primary Examiner* — Christopher K Peterson
(74) *Attorney, Agent, or Firm* — Sheridan Ross P.C.

(57) ABSTRACT

Disclosed herein is a data processing apparatus including: a data sort block configured to sort, into multiple groups by information data of a same type, input data including information data of multiple types formed by multiple bits; a maximum value extraction block configured to extract a maximum value of the information data in each of the groups sorted by the data sort block; and a bit position decision and bit reduction block configured to determine a reduction position of bits common to the information data of the same type in each group on the basis of the maximum value extracted by the maximum value extraction block and reduce the common bits in accordance with the determination.

16 Claims, 10 Drawing Sheets

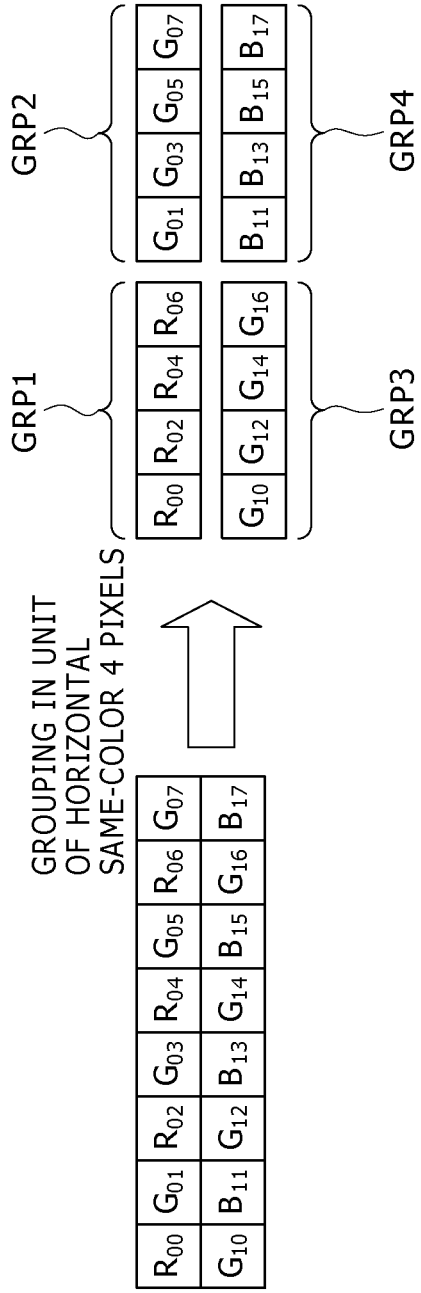

FIG. 3

| BIT COUNT AFTER COMPRESSION | POSITION OF MAXIMUM VALUE DATA | | | |
|---|---|---|---|---|
| | FIRST BIT FROM MSB 2048≦MAXIMUM VALUE (MAX) | SECOND BIT FROM MSB 1024≦MAXIMUM VALUE≦2047 | THIRD BIT FROM MSB 512≦MAXIMUM VALUE≦1023 | FOURTH AND SUBSEQUENT BITS FROM MSB MAXIMUM VALUE≦511 |
| 9bits | REDUCE 0 BIT ON MSB SIDE REDUCE 3 BITS ON LSB SIDE | REDUCE 1 BIT ON MSB SIDE REDUCE 2 BITS ON LSB SIDE | REDUCE 2 BITS ON MSB SIDE REDUCE 1 BIT ON LSB SIDE | REDUCE 3 BITS ON MSB SIDE REDUCE 0 BIT ON LSB SIDE |
| 8bits | REDUCE 0 BIT ON MSB SIDE REDUCE 4 BITS ON LSB SIDE | REDUCE 1 BIT ON MSB SIDE REDUCE 3 BITS ON LSB SIDE | REDUCE 2 BITS ON MSB SIDE REDUCE 2 BITS ON LSB SIDE | REDUCE 3 BITS ON MSB SIDE REDUCE 1 BIT ON LSB SIDE |
| 7bits | REDUCE 0 BIT ON MSB SIDE REDUCE 5 BITS ON LSB SIDE | REDUCE 1 BIT ON MSB SIDE REDUCE 4 BITS ON LSB SIDE | REDUCE 2 BITS ON MSB SIDE REDUCE 3 BITS ON LSB SIDE | REDUCE 3 BITS ON MSB SIDE REDUCE 2 BITS ON LSB SIDE |
| 6bits | REDUCE 0 BIT ON MSB SIDE REDUCE 6 BITS ON LSB SIDE | REDUCE 1 BIT ON MSB SIDE REDUCE 5 BITS ON LSB SIDE | REDUCE 2 BITS ON MSB SIDE REDUCE 4 BITS ON LSB SIDE | REDUCE 3 BITS ON MSB SIDE REDUCE 3 BITS ON LSB SIDE |
| 5bits | REDUCE 0 BIT ON MSB SIDE REDUCE 7 BITS ON LSB SIDE | REDUCE 1 BIT ON MSB SIDE REDUCE 6 BITS ON LSB SIDE | REDUCE 2 BITS ON MSB SIDE REDUCE 5 BITS ON LSB SIDE | REDUCE 3 BITS ON MSB SIDE REDUCE 4 BITS ON LSB SIDE |

DATA REDUCING POSITIONS FOR 12-BIT RAW DATA AND MAXIMUM VALUE INFORMATION = 2 BITS

| MAXIMUM VALUE WITHIN AREA | MAXIMUM VALUE POSITIONAL INFORMATION |
|---|---|
| 2048 ≦ MAXIMUM VALUE | 3(11) |
| 1024 ≦ MAXIMUM VALUE ≦ 2047 | 2(10) |
| 512 ≦ MAXIMUM VALUE ≦ 1023 | 1(01) |
| MAXIMUM VALUE ≦ 511 | 0(00) |

MAXIMUM VALUE MSB POSITIONAL INFORMATION
(4 CATEGORIES EXPRESSED BY 2 BITS)

ADDING RANDOM NUMBERS OF BIT COUNT
EQUAL TO ATTACHED BIT COUNT

INPUT/OUTPUT CHARACTERISTIC OF 12-BIT INPUT, 8-BIT OUTPUT FUNCTION

INPUT/OUTPUT CHARACTERISTIC OF 8-BIT INPUT, 12-BIT OUTPUT FUNCTION

| 1  | 11 | 9  | 4  |
|----|----|----|----|
| 14 | 0  | 6  | 5  |
| 7  | 3  | 15 | 10 |
| 12 | 8  | 2  | 13 |

| 6 | 2 |
|---|---|
| 4 | 0 |

DITHER PATTERNS OF 4x4 AND 2x2

ERROR DUE TO COMPRESSION/DECOMPRESSION
(COMPRESSION FROM 12 BITS TO 6 BITS FOR
BIT REDUCTION : VALUE ROUNDED OFF)

PSNR MEASURING IMAGE

DATA PROCESSING APPARATUSES, DATA PROCESSING METHOD, PROGRAM, AND CAMERA SYSTEM

BACKGROUND

The present disclosure relates to data processing apparatuses, a data processing method, a program, and a camera system that are configured to execute data processing such as data compression for example.

Known raw data compression methods include a technique in which raw data is compressed by variable-length-encoding the raw data by use of spatial frequency domain of an image concerned (refer to Japanese Patent Laid-open No. 2003-224868, for example).

In addition, for a simple compression method, a tone compression technique such as a gamma compression is known.

SUMMARY

However, with the above-mentioned related-art techniques, the volume of computation necessary for the conversion into a spatial frequency domain and the encoding of the conversion is large, so that the processing time becomes long and, if these processing operations are to be realized by hardware circuits, the scale thereof increases for demerits.

With the tone compression, decreasing the number of bits after compression makes the number of tones insufficient, thereby making image deterioration conspicuous.

Therefore, the present disclosure addresses the above-identified and other problems associated with related-art methods and apparatuses and solves the addressed problems by providing a data processing apparatus, a data processing method, a program, and a camera system that are configured to minimize image deterioration while minimizing the processing time and the increase in circuit scale.

In carrying out the disclosure and according to a first mode thereof, there is provided a data processing apparatus. This data processing apparatus has a data sort block configured to sort, into multiple groups by information data of a same type, input data including information data of multiple types formed by multiple bits; a maximum value extraction block configured to extract a maximum value of the information data in each of the groups sorted by the data sort block; and a bit position decision and bit reduction block configured to determine a reduction position of bits common to the information data of the same type in each group on the basis of the maximum value extracted by the maximum value extraction block and reduce the common bits in accordance with the determination.

In carrying out the disclosure and according to a second mode thereof, there is provided a data processing method. This data processing method includes: sorting, into multiple groups by information data of a same type, input data including information data of multiple types formed by multiple bits; extracting a maximum value of the information data in each of the groups sorted in the data sorting; and determining a reduction position of bits common to the information data of the same type in each group on the basis of the maximum value extracted in the maximum value extraction and reducing the common bits in accordance with the determination.

In carrying out the disclosure and according to a third mode thereof, there is provided a program for causing a computer to execute data processing. This data processing includes: sorting, into multiple groups by information data of a same type, input data including information data of multiple types formed by multiple bits; extracting a maximum value of the information data in each of the groups sorted in the data sorting; and determining a reduction position of bits common to the information data of the same type in each group on the basis of the maximum value extracted in the maximum value extraction and reducing the common bits in accordance with the determination.

In carrying out the disclosure and according to a fourth mode thereof, there is provided a camera system. This camera system has an optical system; an imaging device configured to image a subject image passing through the optical system and output raw data; and a data processing apparatus configured to process the raw data. In this configuration, the data processing apparatus has a data sort block configured to sort, into multiple groups by color information data of a same type, input raw data including color information data of multiple types formed by multiple bits, a maximum value extraction block configured to extract a maximum value of the color information data in each of the groups sorted by the data sort block, and a bit position decision and bit reduction block configured to determine a reduction position of bits common to the color information data of the same type in each group on the basis of the maximum value extracted by the maximum value extraction block and reduce the common bits in accordance with the determination.

According to the modes of the present disclosure, the deterioration in image quality can be minimized while minimizing the increase in processing time and circuit scale.

BRIEF DESCRIPTION OF THE DRAWINGS

Other features and modes of the disclosure will become apparent from the following description of embodiments with reference to the accompanying drawings in which:

FIGS. 2A and 2B are diagrams illustrating examples of sorting of Bayer array raw data into groups of same types (or same colors);

FIG. 3 is a diagram illustrating data reduction positions at the time of 12-bit raw data and when maximum value positional information is two bits wide;

DETAILED DESCRIPTION OF THE PREFERRED EMBODIMENTS

This disclosure will be described in further detail by way of embodiments thereof with reference to the accompanying drawings.

It should be noted that the following description is made in the following order:

(1) First embodiment (the first exemplary configuration of a data processing apparatus);
(2) Second embodiment (the second exemplary configuration of a data processing apparatus);
(3) Third embodiment (the third exemplary configuration of a data processing apparatus);
(4) Fourth embodiment (the fourth exemplary configuration of a data processing apparatus);
(5) Fifth embodiment (the fifth exemplary configuration of a data processing apparatus);
(6) Sixth embodiment (the sixth exemplary configuration of a data processing apparatus);
(7) Seventh embodiment (the seventh exemplary configuration of a data processing apparatus); and
(8) Eighth embodiment (the exemplary configuration of a camera system).

(1) First Embodiment

Figure 1:
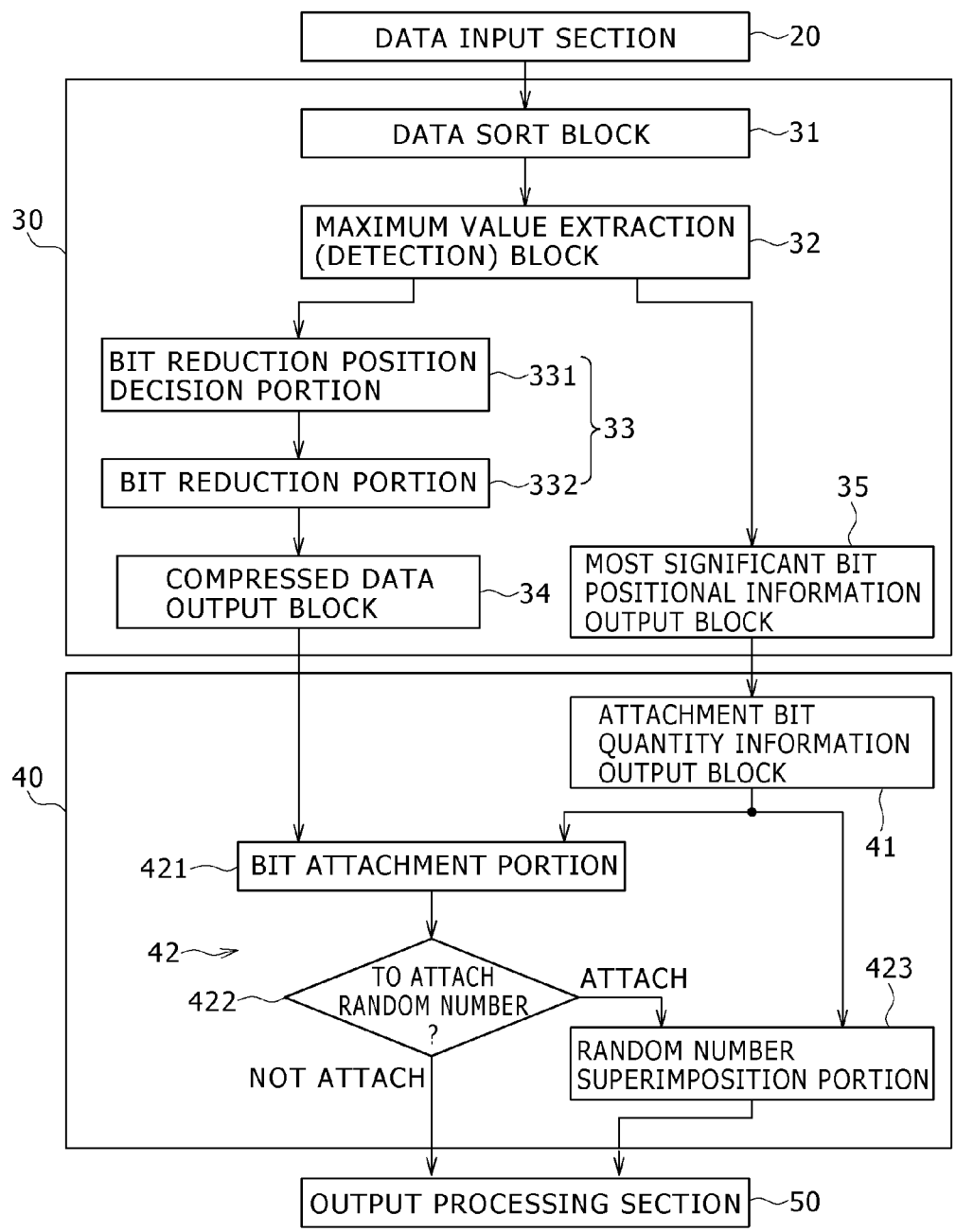
FIG. 1 is a block diagram illustrating an exemplary configuration of a data processing apparatus practiced as a first embodiment of the disclosure.

Referring to FIG. 1, there is shown an exemplary configuration of a data processing apparatus practiced as the first embodiment of the disclosure.

It should be noted that FIG. 1 is also indicative of a conceptual flow of the processing that is executed by the data processing apparatus.

Data to be processed by this data processing apparatus 10 is the raw data of an image, for example.

In the first embodiment, "random number value" to be described below denotes a random number of which value varies for each pixel and the description of this random number value will be skipped below.

The raw data include various types of data in terms of array and bit precision. The following description is indicative of examples in which 12-bit raw data of Bayer array is compressed and decompressed.

In the following description, the 12-bit pixel data of each of R (Red), G (Green), and B (Blue) is equivalent to information data.

The data processing apparatus 10 shown in FIG. 1 has a data input section 20, a compression processing section 30, a decompression processing section 40, and an output processing section 50.

The data input section 20 receives raw data that is input data and enters the received raw data into the compression processing section 30.

The compression processing section 30 has a data sort block 31, a maximum value extraction (detection) block 32, a bit position decision and bit reduction block 33, a compressed data output block 34, and a most-significant-bit positional information output block 35.

The data sort block 31 sorts input raw data including information data of two or more types formed by multiple bits into two or more groups by the information data of the same type and outputs a result of this sorting to the maximum value extraction block 32 and the most-significant-bit positional information output block 35.

Here, information data is pixel data of 12 bits wide [b11: b0] of R, G, and B. The groups of the same type are an R pixel group, a first G pixel group, a second G pixel group, and a B pixel group.

FIGS. 2A and 2B show examples of Bayer array raw data and groups of the same type (or the same color) obtained by sorting this Bayer array raw data.

One Bayer array is formed by R pixel data $R_{00}$, first G pixel data $G_{01}$, second G pixel data $G_{10}$, and B pixel data $B_{11}$ as shown in FIG. 2A.

Likewise, another Bayer array is formed by R pixel data $R_{02}$, first G pixel data $G_{03}$, second G pixel data $G_{12}$, and B pixel data $B_{13}$.

Still another Bayer array is formed by R pixel data $R_{04}$, first G pixel data $G_{05}$, second G pixel data $G_{14}$, and B pixel data $B_{15}$.

Yet another Bayer array is formed by R pixel data $R_{06}$, first G pixel data $G_{07}$, second G pixel data $G_{16}$, and B pixel data $B_{17}$.

In the example shown in FIG. 2A, arranged on the first row are R pixel data $R_{00}$, first G pixel data $G_{01}$, R pixel data $R_{02}$, first G pixel data $G_{03}$, R pixel data $R_{04}$, first G pixel data $G_{05}$, R pixel data $R_{06}$, and first G pixel data $G_{07}$.

Arranged on the second row are second G pixel data $G_{10}$, B pixel data $B_{11}$, second G pixel data $G_{12}$, B pixel data $B_{13}$, second G pixel data $G_{14}$, B pixel data $B_{15}$, second G pixel data $G_{16}$, and B pixel data $B_{17}$.

In the example shown in FIG. 2B, the Bayer array raw data is sorted into groups of the same type (the same color) as follows.

R pixel data of 12 bits on the first row $R_{00}$, $R_{02}$, $R_{04}$, and $R_{06}$ are sorted into R pixel group GRP1 and the first G pixel data $G_{01}$, $G_{03}$, $G_{05}$, and $G_{07}$ are sorted into the first G pixel group GRP2.

The second G pixel data of 12 bits on the second row $G_{10}$, $G_{12}$, $G_{14}$, and $G_{16}$ are sorted into the second G pixel group GRP3 and B pixel data $B_{11}$, $B_{13}$, $B_{15}$, and $B_{17}$ are sorted into B pixel group GRP4.

As above, data are grouped in a unit of horizontal same-color four pixels.

The maximum value extraction block 32 extracts a maximum value of two or more pieces (four in this example) of pixel data in the groups GRP1 through GRP4 obtained by the sorting by the data sort block 31 and outputs the obtained extraction information to the bit position decision and bit reduction block 33 and the most-significant-bit positional information output block 35.

It should be noted that, of the 12 bits of each piece of pixel data, it is highly possible for the maximum value to be extracted if logic 1 is set to a bit near to the MSB (Most Significant Bit).

For example, if the bit to which logical 1 is set among 12 bits that is on the side of the MSB is bit b11 that is the MSB, then the maximum value MAX is 2048 or higher (2048≤MAX).

If the bit to which logical 1 is set among 12 bits that is on the side of the MSB is bit b10 next to the MSB, then the maximum value MAX is a value within a range of 1024≤MAX≤2047.

If the bit to which logical 1 is set among 12 bits that is on the side of the MSB is bit b9 that is the second next to the MSB, then the maximum value MAX is a value within a range of 512≤MAX≤1023.

If the bit to which logical 1 is set among 12 bits that is on the side of the MSB is bit b8 that is the third next to the MSB, then the maximum value MAX is a value within a range of MAX≤511.

In the above-mentioned example, there are four as the number of pieces of the maximum value positional information that is the most-significant-bit positional information, so that maximum value positional information MAXINF can be expressed by two bits.

For example, if 2048≤MAX, then maximum value positional information MAXINF is set to "11" or "00"; if 1024≤MAX≤2047, then maximum value positional information MAXINF is set to "10" or "01."

Likewise, if 512≤MAX≤1023, then maximum value positional information MAXINF is set to "01" or "10"; if MAX≤511, then maximum value positional information MAXINF is set to "00" or "11."

In addition, if the bit setting is on the side of LSB (Least Significant Bit), LSB bit positional information can be employed as a maximum value. In this case, the number of bits of maximum value positional information MAXINF is three or more.

The bit position decision and bit reduction block 33 determines the position of the reduction of the common bits of pixel data that is the information data of the same type in each group on the basis of the maximum value MAX extracted by the maximum value extraction (detection) block 32 and reduces the common bits in accordance with a result of this determination thereby compressing the data.

In this example, the bit position decision and bit reduction block 33 includes a bit reduction position decision portion 331 configured to determine a position of reducing common bits of pixel data that is information data of the same type within each group and a bit reduction portion 332 configured to reduce common bits in accordance with a result of this decision.

In the pixel data that is the information data of the same type within each group, the bit position decision and bit reduction block 33 reduces a bit higher than the most significant setting bit in the pixel data that is the information data indicative of maximum value MAX.

The bit position decision and bit reduction block 33 employs the number of bits to be reduced, such as 2, 3, 4, 5, 6, and 7 bits.

In the pixel data that is the information data within each group, the bit position decision and bit reduction block 33 executes bit reduction starting from the LSB bit after reducing the bits higher than the most significant setting bit and the MSB in a bit array in the pixel data that is the information data indicative of the maximum value MAX.

Referring to FIG. 3, there is shown a diagram illustrating data reduction positions for 12-bit raw data and when maximum value positional information is two bits wide.

If the maximum value MAX is a value in a range of 2048≤MAX, then bit reduction is executed as follows.

In this case, if the bit to which logical 1 is set among 12 bits that is on the side of the MSB is bit b11 that is the MSB of pixel data, then two or more bits predetermined toward the higher bits from the LSB are reduced.

If the 12 bits are reduced by three bits to be compressed to nine bits, a total of three bits of LSB bit b0, bit b1, and bit b2 are reduced.

If the 12 bits are reduced by four bits to be compressed to eight bits, a total of four bits of LSB bit b0, bit b1, bit b2, and bit b3 are reduced.

If the 12 bits are reduced by five bits to be compressed to seven bits, a total of five bits of LSB bit b0, bit b1, bit b2, bit b3, and bit b4 are reduced.

If the 12 bits are reduced by six bits to be compressed to six bits, a total of six bits of LSB bit b0, bit b1, bit b2, bit b3, bit b4, and bit b5 are reduced.

If the 12 bits are reduced by seven bits to be compressed to five bits, a total of seven bits of LSB bit b0, bit b1, bit b2, bit b3, bit b4, bit b5, and bit b6 are reduced.

If the maximum value MAX is a value in a range of 1024≤MAX≤2047, then bit reduction is executed as follows.

If the bit to which logical 1 is set among 12 bits that is on the side of the MSB is bit b10 next to the MSB of pixel data, then the MSB (b11) and the LSB (b0) or two or more bits predetermined toward the higher bits from the LSB are reduced.

If the 12 bits are reduced by three bits to be compressed to nine bits, a total of three bits of MSB bit b11, LSB bit b0, and bit b1 are reduced.

If the 12 bits are reduced by four bits to be compressed to eight bits, a total of four bits of MSB bit b11, LSB bit b0, bit b1, and bit b2 are reduced.

If the 12 bits are reduced by five bits to be compressed to seven bits, a total of five bits of MSB bit b11, LSB bit b0, bit b1, bit b2, and bit b3 are reduced.

If the 12 bits are reduced by six bits to be compressed to six bits, a total of six bits of MSB bit b11, LSB bit b0, bit b1, bit b2, bit b3, and bit b4 are reduced.

If the 12 bits are reduced by seven bits to be compressed to five bits, a total of seven bits of MSB bit b11, LSB bit b0, bit b1, bit b2, bit b3, bit b4, and bit b5 are reduced.

If the maximum value MAX is a value in a range of 512≤MAX≤1023, then bit reduction is executed as follows.

If the bit to which logical 1 is set among 12 bits that is on the side of the MSB is bit b9 that is the second next to the MSB of pixel data, then bit b10, bit b11, LSB (b0) or two or more bits predetermined toward the higher bits from the LSB are reduced.

If the 12 bits are reduced by three bits to be compressed to nine bits, a total of three bits of bit b10 and bit b11 on the higher side toward the MSB and LSB bit b0 are reduced.

If the 12 bits are reduced by four bits to be compressed to eight bits, a total of four bits of bit b10 and bit b11 on the higher side toward the MSB and LSB bit b0 and bit b1 are reduced.

If the 12 bits are reduced by five bits to be compressed to seven bits, a total of five bits of bit b10 and bit b11 on the higher side toward the MSB and LSB bit b0, bit b1, and bit b2 are reduced.

If the 12 bits are reduced by six bits to be compressed to six bits, a total of six bits of bit b10 and bit b11 on the higher side toward the MSB and LSB bit b0, bit b1, bit b2, and bit b3 are reduced.

If the 12 bits are reduced by seven bits to be compressed to five bits, a total of seven bits of bit b10 and bit b11 on the higher side toward the MSB and LSB bit b0, bit b1, bit b2, bit b3, and bit b4 are reduced.

If the maximum value MAX is a value in a range of MAX≤511, then bit reduction is executed as follows.

If the bit to which logical 1 is set among 12 bits that is on the side of the MSB is bit b8 that is the third next to the MSB of pixel data, then bit b9 through bit b11, LSB (b0) or two or more bits predetermined toward the higher bits from the LSB are reduced.

If the 12 bits are reduced by three bits to be compressed to nine bits, a total of three bits of bit b9, bit b10, and bit b11 on the higher side toward the MSB are reduced.

If the 12 bits are reduced by four bits to be compressed to eight bits, a total of four bits of bit b9, bit b10 and bit b11 on the higher side toward the MSB and LSB bit b0 are reduced.

If the 12 bits are reduced by five bits to be compressed to seven bits, a total of five bits of bit b9, bit b10 and bit b11 on the higher side toward the MSB and LSB bit b0 and bit b1 are reduced.

If the 12 bits are reduced by six bits to be compressed to six bits, a total of six bits of bit b9, bit b10 and bit b11 on the higher side toward the MSB and LSB bit b0, bit b1 and bit b2 are reduced.

If the 12 bits are reduced by seven bits to be compressed to five bits, a total of seven bits of bit b9, bit b10 and bit b11 on the higher side toward the MSB and LSB bit b0, bit b1, bit b2 and bit b3 are reduced.

The compressed data output block 34 outputs the compressed data (image data) of which number of bits has been reduced by the bit position decision and bit reduction block 33 to the decompression processing section 40.

The most-significant-bit positional information output block 35 generates maximum value positional information MAXINF that is the most-significant-bit positional information indicative of a most significant setting bit position in the information data indicative of a maximum value MAX by the maximum value extraction block 32 and outputs the generated maximum value positional information MAXINF to the decompression processing section 40.

Figures 4, 5:
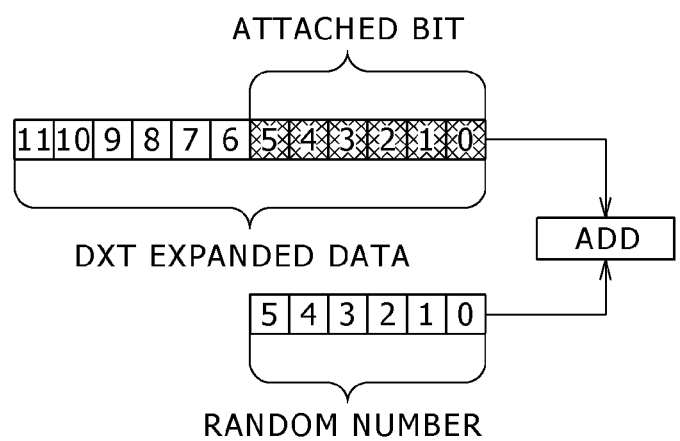
FIG. 4 is a diagram illustrating one example of maximum value positional information outputted by a most-significant-bit positional information output block.
FIG. 5 is a schematic diagram illustrating processing of superimposing a random number having the same number of bits as the number of additional bits.

Referring to FIG. 4, there is shown one example of the maximum value positional information outputted by the most-significant-bit positional information output block 35.

In this example, if 2048≤MAX, the maximum value positional information MAXINF is set to "11 (3)"; if 1024≤MAX≤2047, the maximum value positional information MAXINF is set to "10 (2)."

By the same token, if 512≤MAX≤1023, the maximum value positional information MAXINF is set to "01 (1)"; if MAX≤511, the maximum value positional information MAXINF is set to "00 (0)."

The decompression processing section 40 has an attachment bit quantity information output block 41 and a bit attachment/decompression block 42.

The attachment bit quantity information output block 41 receives the maximum value positional information MAXINF that is the most-significant-bit positional information from the most-significant-bit positional information output block 35, converts the received maximum value positional information MAXINF into attachment bit quantity information to be attached, and outputs a result of the conversion to the bit attachment/decompression block 42.

In this example, maximum value positional information MAXINF "11" when 2028≤MAX is converted into 3 and maximum value positional information MAXINF "10" when 1024≤MAX≤2047 is converted into 2.

Likewise, maximum value positional information MAXINF "01" when 512≤MAX≤1023 is converted into 1 and maximum value positional information MAXINF "00" when MAX≤511 is converted into 0.

On the basis of the attachment bit quantity information, the bit attachment/decompression block 42 determines a bit attachment quantity and attaches the determined number of bits to the output data of the compressed data output block 34 in accordance with the determination.

The bit attachment/decompression block 42 attaches a random number when decompressing by bit attachment.

In attaching a random number, the bit attachment/decompression block 42 uses a function of attaching attachment bit quantity information in accordance with maximum value positional information.

The bit attachment/decompression block 42 shown in FIG. 1 has a bit attachment portion 421, a random number attachment decision portion 422, and a random number superimposition portion 423.

The random number attachment decision portion 422 determines whether to attach a random number to the output decompression data of the bit attachment portion 421. This decision can be made in a variety of modes, such as the decision by a preset state and the decision by image brightness information, for example.

In attaching a random number, the random number is attached to the decompression data by the bit attachment portion 421.

Referring to FIG. 5, there is shown a schematic diagram illustrating the processing of superimposing a random number having the same number of bits as the number of attachment bits.

In the example shown in FIG. 5, 6-bit attachment when six bits (b0 through b5) from LSB are reduced from 12-bit data and the addition of a 6-bit random number are shown.

The output processing section 50 can execute the processing of restoration for example on the data decompressed by the decompression processing section 40.

The following describes an operation of the data processing apparatus 10 shown in FIG. 1 having the above-mentioned configuration.

Raw data is entered in the data sort block 31 of the compression processing section 30 through the data input section 20 to be sorted into groups by color.

Here, the data sort block 31 sorts the four pixels of the same color in the horizontal direction into the same groups as shown in FIGS. 2A and 2B for example.

In application of the present apparatus to a circuit of processing the raw data taken by an electronic camera, the taken raw data is entered in the processing circuit by raster scan, so that it is desirable to execute the sorting in the horizontal direction in order to attain a reduced circuit scale.

Sorting in a two-dimensional area in the vertical direction or the horizontal direction requires a line memory, resulting in a tendency of increased circuit scale.

As described above, the Bayer array raw data shown in FIG. 2A is arranged in unit of four pixels of the same color in the horizontal direction as shown in FIG. 2B.

Next, in the maximum value extraction block 32, a maximum value MAX of the four pixels in each sorted group is extracted and the most significant setting bit position of the maximum data is detected.

That is, the bit position in which logic 1 is set to the bit nearest to MSB is detected.

Next, in the bit reduction position decision portion 331, the position of reducing the common bit of the pixel data that is the information data of the same type within each group is determined. On the basis of the information of this determination, the common bit in accordance with the determination is reduced in the bit reduction portion 332. In the bit reduction portion 332, the bit at the same position throughout the four data in each group is reduced.

In FIG. 3, the positions on the MSB side of the maximum value MAX are sorted by four; increasing the divider to eight, 16, and so on, for example, can reduce the amount of truncation to be executed when the maximum value MAX is relatively small.

It should be noted, however, that the positional information of the most significant setting bit of one maximum value for each group is outputted, so that, as the divider increases, the compression ratio lowers.

The reduced data is outputted from the compressed data output block 34.

In addition, for each sorted group, the most-significant-bit positional information output block 35 outputs one of the pieces of maximum value positional information MAXINF that is the most-significant-bit positional information indicative of the most significant setting bit position in the information data indicative of the maximum value MAX.

For example, suppose that the data of group GRP1 shown in FIG. 2B be $R_{00}=800$, $R_{02}=2500$, $R_{04}=1300$, and $R_{06}=200$. The maximum value of these four points is 2500 of $R_{02}$ and the maximum value bit position exists at bit b11 that is the MSB of 12 bits. For example, in the case of reducing raw data from 12 bits to six bits, the compression method of this area determines to reduce six bits from LSB as shown in the table of FIG. 3.

The compression method executes this determination such that the bit reduction (the bits equivalent to the number of compressed bits is extracted from the higher bit position from the bit to which 1 is set on the MSB side of the maximum value and one or more bits from the LSB toward higher bit side) not to reduce the most significant setting bit on the side of the MSB of the maximum value is selected.

It is assumed that the reduction method execute here truncation selected from among the functions such as truncation, rounding, and rounding off a number to the nearest integer. The data after bit reduction becomes $R_{00}=12$, $R_{02}=39$, $R_{04}=20$, and $R_{06}=3$, respectively.

The bit positional information on the MSB side of the maximum value can be expressed by a signal of two bits in the four sorting operations shown in FIG. 3; for example, executing bit allocation to the sorting result as shown in FIG. 4 causes the maximum value positional information MAXINF to be 3.

The following describes the processing of decompressing the compressed data.

The maximum value positional information MAXINF outputted from the most-significant-bit positional information output block 35 is entered in the attachment bit quantity information output block 41 of the decompression processing section 40 to be converted into attachment bit quantity information to be outputted.

For example, the maximum value positional information MAXINF generated in accordance with the example shown in FIG. 4 is converted into attachment bit quantity information in accordance with FIG. 3 and FIG. 4.

Because the maximum value positional information MAXINF is 3 now, the maximum value within the area is 2048 or higher from FIG. 4 and, because the mode is the 6-bit compression mode from FIG. 3, it is seen that six bits have been reduced from the LSB side.

In order to restore the original form, six bits may only be attached to the LSB side, so that information that six bits are to be attached to the LSB side is outputted to the bit attachment portion 421.

The compressed data outputted from the compressed data output block 34 is also entered in the bit attachment portion 421 to be decompressed on the basis of the attachment bit quantity information. Because the attachment bit quantity information is "attach six bits to the LSB side," so that six zeros are attached to the LSB side, namely, the compressed data is multiplied by 64.

The compressed data are $R_{00}=12$, $R_{02}=39$, $R_{04}=20$, and $R_{06}=3$, respectively, so that the data after decompression become $R_{00}=768$, $R_{02}=2496$, $R_{04}=1280$, and $R_{06}=192$, respectively. The decompressed data are entered in the random number attachment decision portion 422.

In the random number attachment decision portion 422, if the user desires an operation to attach a random number to decompressed data, for example, the decompressed data is entered in the random number superimposition portion 423; if the user does not desire this operation, the decompressed data is outputted without change to the output processing section 50, upon which the compression/decompression processing comes to an end.

In attaching a random number, a random number is superimposed on the decompressed data in the random number superimposition portion 423. The attachment bit quantity information outputted from the attachment bit quantity information output block 41 is also entered in the random number superimposition portion 423.

The attachment bit quantity information allows the user to understand how many zeros have been attached to the LSB side, thereby making it possible to superimpose a random number only onto an attached bit string.

A random number having the number of bits more than the number of attached bits. There are various types of random numbers. It is effective to superimpose a white noise random number in the number equal to the number of attached bits, the white noise random number being uniform in appearance probability over all ranges (refer to FIG. 5).

The data to which a random number has been added is processed for outputting in the output processing section 50, upon which the compression/decompression processing comes to an end.

(2) Second Embodiment

Figure 6:
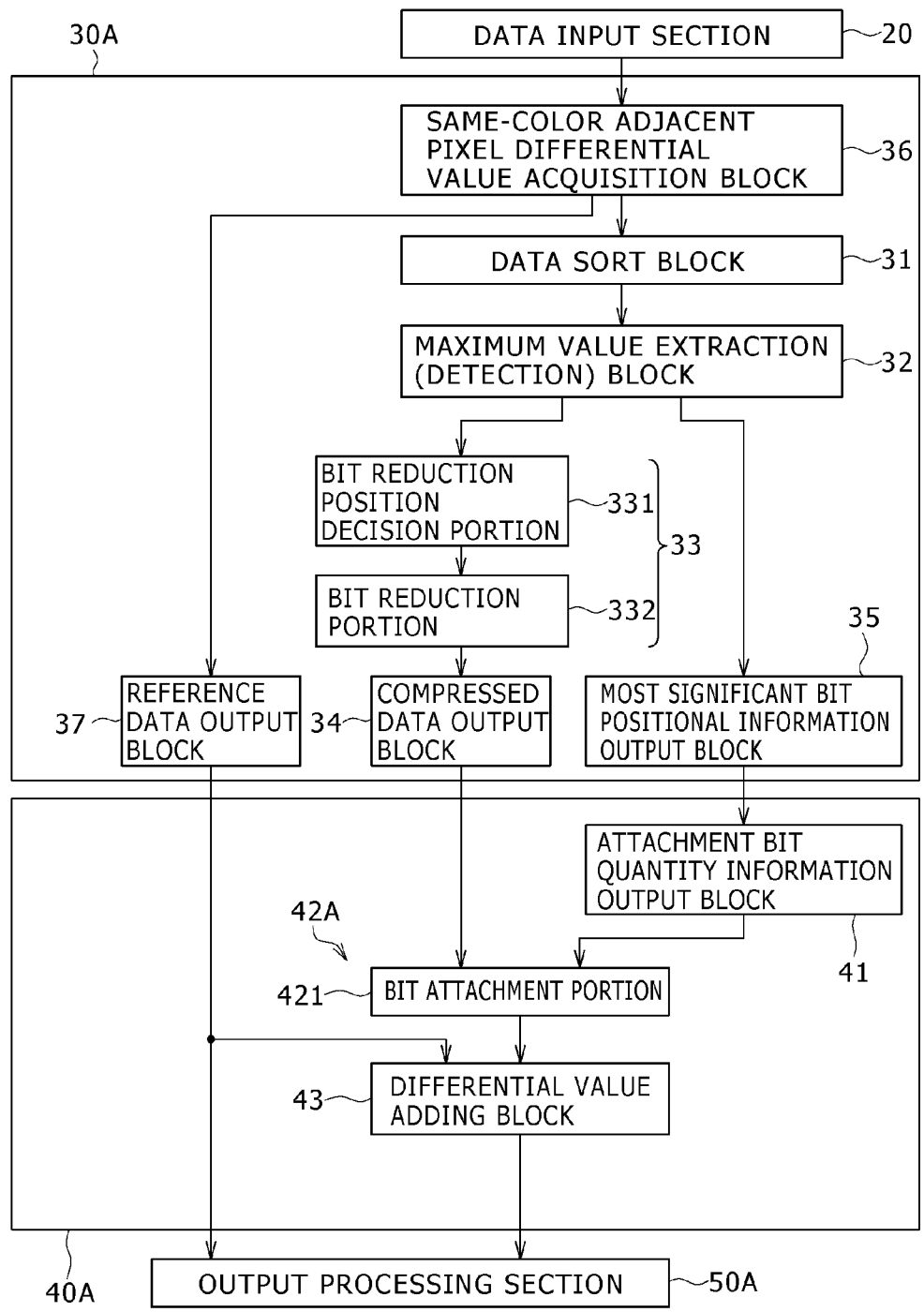
FIG. 6 is a block diagram illustrating a data processing apparatus practiced as a second embodiment of the disclosure.

Referring to FIG. 6, there is shown an exemplary configuration of a data processing apparatus practiced as a second embodiment of the disclosure.

The data processing apparatus 10A practiced as the second embodiment of the disclosure differs from the data processing apparatus 10 practiced as the first embodiment in that a differential value between same-color adjacent pixels is applied to the compression/decompression processing.

In a compression processing section 30A of the data processing apparatus 10A, a differential value acquisition block 36 on the same-color adjacent pixel side and a reference data output block 37 are arranged on the input side of a data sort block 31.

In addition, in a decompression processing section 40A of the data processing apparatus 10A, a differential value adding block 43 is arranged on the output side of a bit attachment/decompression block 42A instead of arranging a random number attachment decision portion and a random number superimposition portion.

The differential value acquisition block 36 receives input raw data to obtain a differential value between adjacent information data within each group, obtains a code and an absolute value of the obtained differential value, and supplies an absolute differential value including the obtained code to the data sort block 31. In addition, the differential value acquisition block 36 outputs the reference data associated with the input raw data to the bit attachment/decompression block 42A through the reference data output block 37.

The differential value adding block 43 executes data restoration in accordance with the decompressed differential value data and code outputted from the bit attachment portion and the reference data.

Then, a maximum value extraction block 32 and a bit position decision and bit reduction block 33 executes maximum value extraction and bit position decision and bit reduction processing on the absolute differential value data, respectively, and a most-significant-bit positional information output block 35 outputs the value and code of each head information data of each group to an decompression processing section 40A.

The bit attachment/decompression block 42A obtains the decompressed differential value data decompressed through bit attachment and outputs the decompressed differential value data to the differential value adding block 43.

The differential value adding block 43 restores the adjacent information data in the same group of the reference data by use of the reference data, the first differential value data, and the code information. Then, the differential value adding block 43 restores the data by repeating the above-mentioned computation by use of the differential value data between the restored information data and the adjacent information data of the same group and the code information.

The following describes reasons for the employment of the above-mentioned configuration.

Generally, the values of a neighboring same-color pixels in a natural image is often close to each other except for the edge portions of the image, so that the difference between same-color adjacent pixels is relatively small.

In the compression/decompression processing of the present embodiment, as the value of data increases, the reduction quantity on the LSB side increases, making the error due to compression/decompression tend to increase. In the compression/decompression method that provides the basic configuration shown in FIG. 1, a brighter portion of an image likely results in a larger error in compression/decompression.

However, the differential value from a same-color adjacent pixel is low even in a bright portion of an image, so that, if the compression/decompression method providing the basic configuration shown in FIG. 1 is applied, the error due to compression/decompression can be minimized.

The following describes a flow of the processing in associated with FIG. 6.

Raw data entered through an data input section 20 is entered in the differential value acquisition block 36 of same-color adjacent pixels to compute a differential value between same-color adjacent pixels.

In the differential value acquisition block 36, the direction in which a differential value computed is horizontal if grouping is executed in the horizontal direction and vertical if grouping is executed in the vertical direction.

Figure 7:
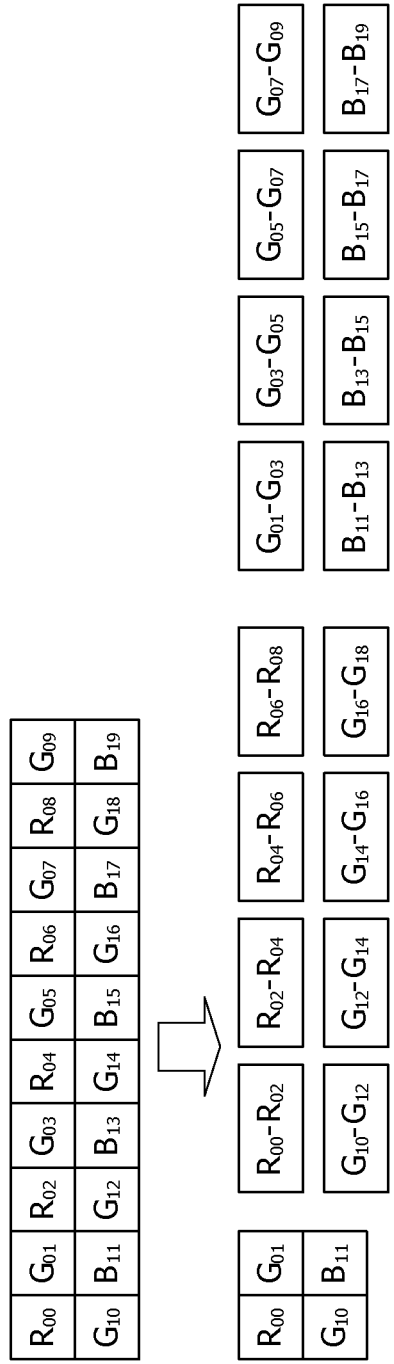
FIG. 7 is a diagram illustrating one example of computation processing of computing a difference value executed in a difference value acquisition block.

Referring to FIG. 7, there is shown one example of differential value computation processing to be executed in the differential value acquisition block 36.

The differential value acquisition block 36 computes differential values as shown in FIG. 7 when the differential computation is executed in the horizontal direction.

In the example shown in FIG. 7, in R pixel group GRP1, differential values $(R_{00}-R_{02})$, $(R_{02}-R_{04})$, $(R_{04}-R_{06})$, and $(R_{06}-R_{08})$ are computed.

In the first G pixel group GRP2, differential values $(G_{01}-G_{03})$, $(G_{03}-G_{05})$, $(G_{05}-G_{07})$, and $(G_{07}-G_{09})$ are computed.

In the second G pixel group GRP3, differential values $(G_{10}-G_{12})$, $(G_{12}-G_{14})$, $(G_{14}-G_{16})$, and $(G_{16}-G_{18})$ are computed.

In B pixel group GRP4, differential values $(B_{11}-B_{13})$, $(B_{13}-B_{15})$, $(B_{15}-B_{17})$, and $(B_{17}-B_{19})$ are computed.

The computed differential values are supplied to the data sort block 31. In a compression processing section 30A, the compression processing is executed in the same manner as the basic configuration shown in FIG. 1.

It should be noted that, because the data to be compressed is differential values, if the entered raw data is 12 bits wide, the area of differential values is −4095 to 4095 of 13 bits.

Therefore, the differential values to be outputted are outputted as a 1-bit code+12-bit absolute differential value. In the compression processing, this absolute differential value is compressed and the compressed value is outputted as compressed data attached with a 1-bit code.

The differential value acquisition block 36 of same-color adjacent pixels further outputs reference data to the reference data output block 37. The reference data herein denotes pixels for providing the first reference for differential value computation in each row and column. In the compression by the horizontal grouping, $R_{00}$, $G_{01}$, $G_{10}$, and $B_{11}$ provide the reference data. These pieces of data are not compressed and outputted from the reference data output block 37 as they are.

The following describes a decompression method in the second embodiment.

Compressed differential value data is decompressed by a bit attachment/decompression block 42A by attaching bits in the same manner as the decompression method of the basic configuration shown in FIG. 1.

In the second embodiment, a bit attachment portion 421A outputs the decompressed differential value data and 1-bit code data, which are restored in the differential value adding block 43.

Reference data outputted from the reference data output block 37 is also entered in the differential value adding block 43.

In the differential value adding block 43, the same-color adjacent pixels of the reference data are restored by use of the reference data, the first differential value data and the code information. By repeating the computation by use of the differential value data between the restored pixels and the same-color adjacent pixels thereof and the code, the data is restored.

In the output processing section 50, the restored data is processed for outputting, upon which the compression/decompression processing comes to an end.

(3) Third Embodiment

The following describes the third embodiment.

Figure 8:
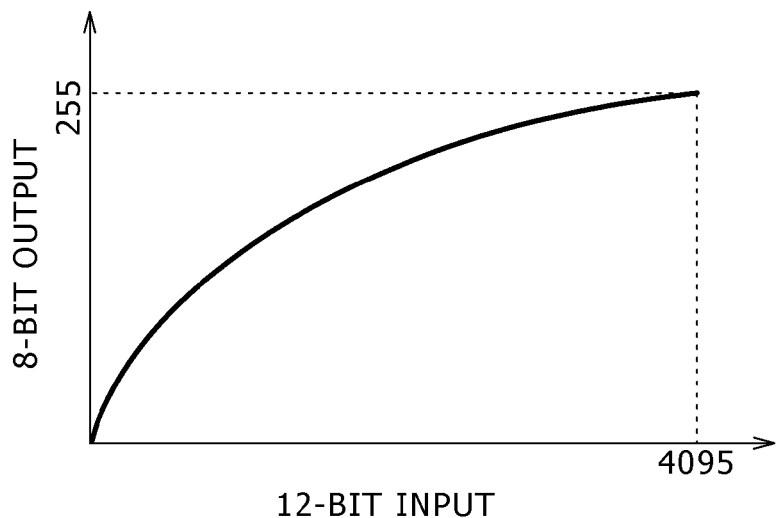
FIG. 8 is a graph indicative of processing of bit reduction in input data by use of a function expressed by a monotonously increasing function in a third embodiment of the disclosure.

Referring to FIG. 8, there is shown a diagram for explaining the processing of bit reduction on input data by use of a function expressed by a monotonously increasing function.

Figure 9:
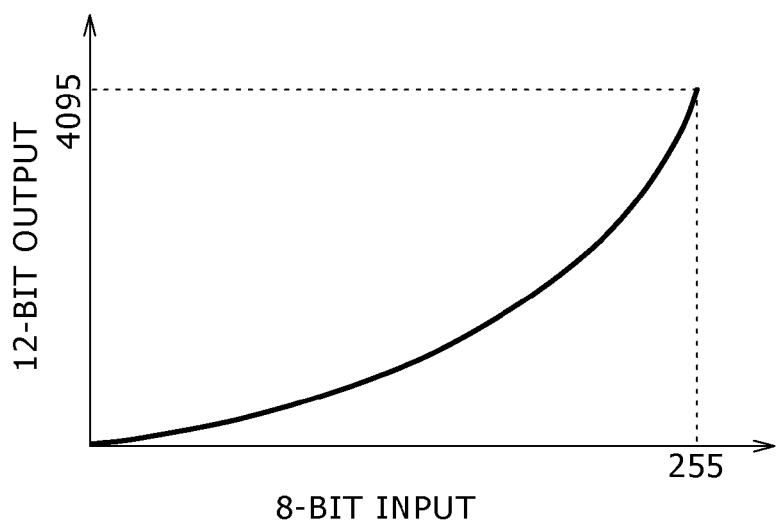
FIG. 9 is a graph indicative of compressed data decompression processing by use of a function expressed by a monotonously increasing function in the third embodiment of the disclosure.

Referring to FIG. 9, there is shown a diagram for explaining the decompression processing to be executed on compressed data by use of a function expressed by a monotonously increasing function.

In the compression/decompression method of the basic configuration (FIG. 1) of the first embodiment described before, input data is sorted into two or more groups of the same color without change and the maximum value MAX of each group is detected to determine the reduction quantity on the LSB side.

If 12-bit data is compressed to 5-bit data, there are a maximum of eight reduction quantities (0-bit reduction to 7-bit reduction) of the data on the LSB side.

In order to express all of these eight quantities, maximum value positional information MAXINF requires 3 bits. When the quantity of the positional information on the MSB side of the maximum value is large, a low compression ratio will result, so that, in order to achieve a high compression ratio, it is desired for the quantity of the positional information on the MSB side of the maximum value to be small.

Therefore, in the third embodiment, by use of the compression/decompression method of the basic configuration shown in FIG. 1, 12-bit input data is reduced to 8-bit input data by use of a function expressed by a monotonously increasing function as shown in FIG. 8 in the data input section 20.

The function may be in any form; however, preferably, the function shape be a bump upward for storing more tones for darker portions (an area having smaller data values) of an image.

The resultant 8-bit data is entered in the data sort block 31 and then compressed in the same manner as the compression/decompression processing of the basic configuration shown in FIG. 1. In compressing 8-bit data into 5-bit data, there are a maximum of four data reduction quantities (0-bit reduction to 3-bit reduction) on the LSB side and the maximum value positional information can be expressed by 2 bits.

Decompression is also executed in the same manner as the compression/decompression method of the basic configuration shown in FIG. 1, restoring the 8-bit data from the 5-bit data, thereby decompressing the 8-bit data to 12-bit data by a monotonously increasing function as shown on the function processing shown in FIG. 9 in an output processing section 50A. It is desired that this function has a characteristic in which the function output shown in FIG. 8 returns to the function input shown in FIG. 8 through the processing by function shown in FIG. 9.

For example, if the function shown in FIG. 8 is $Y=X^{0.5}$ ($0 \leq X \leq 1$), then the function shown in FIG. 9 is $Y=X^2$ ($0 \leq X \leq 1$).

(4) Fourth Embodiment

The following describes the fourth embodiment.

Figures 10, 11:
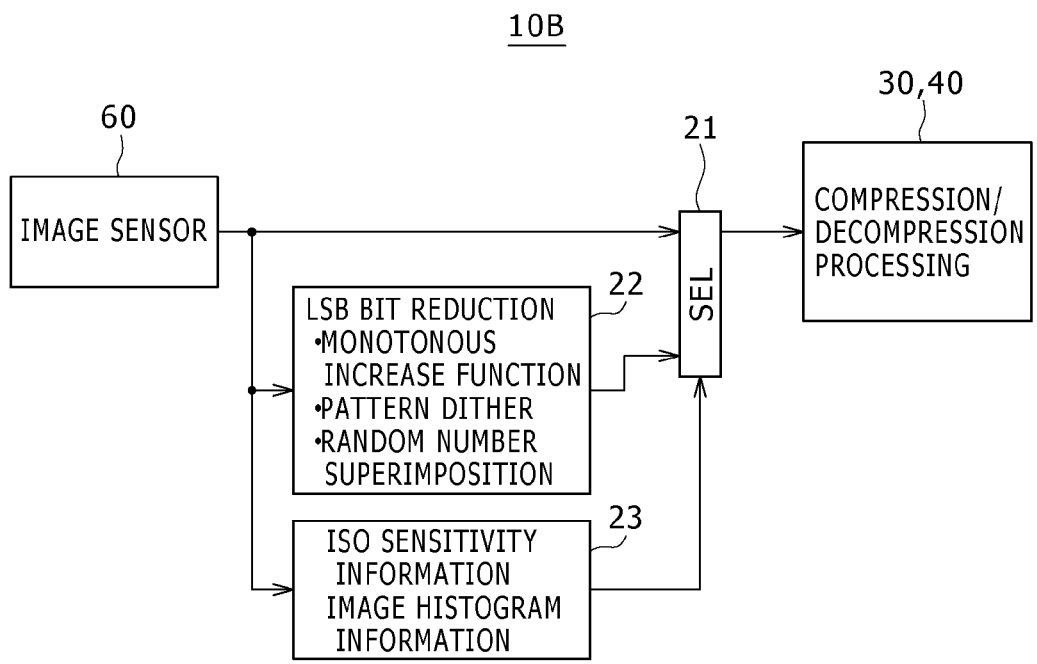
FIG. 10 is a diagram illustrating one example of pattern dither that is applied in a fourth embodiment of the disclosure.
FIG. 11 is a block diagram illustrating an exemplary configuration of a data processing apparatus practiced as a sixth embodiment of the disclosure.

Referring to FIG. 10, there is shown one example of pattern dither that is applied in the fourth embodiment of the disclosure.

It should be noted that a data processing apparatus practiced as the fourth embodiment can employ the basic configuration shown in FIG. 1 described before.

In the third embodiment, bit reduction is executed by use of a monotonously increasing function. In the fourth embodiment, the bit reduction is executed by applying pattern dither instead of using a monotonously increasing function, in the data input section 20.

The pattern dither is of various types. For example, if 12-bit raw data of Bayer array in which R, G, G, B are arranged in the sequence of upper left, upper right, lower left, and lower right on a 2×2 basis is compressed to 8-bit data, the following patterns can be applied. For example, two patterns are prepared; in one pattern, values 1 to 15 are randomly arranged in a 4×4 area and, in the other, values 0, 2, 4, and 6 are randomly arranged in a 2×2 area.

For example, these dither patterns are as shown in FIG. 10.

In reducing 12-bit data to 8-bit data, the G pixels of the 12-bit data are grouped into the same-color 4×4 and the R and B pixels are grouped into the same-color 2×2 respectively, making the G pixels correspond to a 4×4 dither pattern and the R and B pixels to a 2×2 dither pattern respectively.

First, the four bits on the LSB side are reduced and a value of the four bits to be reduced is compared with a value of the corresponding dither pattern. If the value of the four bits to be reduced is greater than the dither pattern value, then one is added to the value of the reduced eight bits. If the value of the reduced eight bits is 255 (the maximum value), no addition is executed.

This operation is repeated on all pixels to reduce the 12-bit data to the 8-bit data.

Then, in the output processing section 50, no function computation is executed; instead, the data is simply multiplied by 16 to convert the 8-bit data to the 12-bit data.

(5) Fifth Embodiment

The following describes the fifth embodiment of the disclosure.

It should be noted that the configuration of a data processing apparatus practiced as the fifth embodiment may be the basic configuration shown in FIG. 1 described before.

In the fourth embodiment, the bit reduction is executed by applying pattern dither. In the fifth embodiment, random number addition is applied instead of pattern dither.

Uniform random numbers are generated with a value range from zero to the maximum value of the number of reduction bits on the LBS side, a random number of the same number of bits as the reduction bit string and the reduction bits is added, and, if the value after the addition exceeds the maximum number of the reduction bit string, one is added to the compressed data. If the compressed data has already reached the maximum value, no addition is executed.

The above-mentioned operation is executed on all pixels to execute bit reduction. For example, in the case of reducing 12-bit data to 8-bit data, a random number with the value range of 0 to 15 is generated and the generated random number is added to the four bits to be reduced for each pixel. If a result of the addition exceeds 15 (that is, 16 or higher), one is added to the 8-bit string of the compressed data. If the compressed data is equal to 255, no addition is executed.

Then, in the output processing section 50, no functional computation is executed; instead, the data is simply multiplied by 16 to convert 8-bit data to 12-bit data.

(6) Sixth Embodiment

The following describes the sixth embodiment of the disclosure.

Referring to FIG. 11, there is shown an exemplary configuration of a data processing apparatus practiced as the sixth embodiment of the disclosure.

It should be noted that, for the configurations of a compression processing section and a decompression processing section of the data processing apparatus, the basic configuration shown in FIG. 1 described before can be employed.

This data processing apparatus 10B has an image sensor 60 configured to output raw data.

A data input section 20B has a selector 21, an LSB bit reduction block 22, and an image histogram information output block 23.

The LSB bit reduction block 22 includes one or two or all of the processing functions of the third, fourth, and fifth embodiments.

The selector 21 selects the data outputted from the image sensor 60 or the data reduced by the LSB bit reduction block 22 depending on an output of the histogram information output block 23 and supplies the selected data to the compression processing section 30.

Generally, the output data from the image sensor 60 is often small in value when sensitivity is high. A gain is applied to this small value in the image sensor 60 and a resultant value is outputted or a gain is applied to this small value in the post processing after outputting from the image sensor 60 for signal amplification.

If a gain is applied in the post processing after outputting from the image sensor 60, data is actually often included in the lower bits except the case in which a light source has been taken even if 12-bit data is outputted from the image sensor 60.

In the third, fourth, and fifth embodiments described before, data is compressed including dark portions (portions of small amounts of data). In the compression/decompression method of the basic configuration shown in FIG. 1, the error due to compression/decompression processing occurs less often as the data becomes smaller in quantity.

For example, if 12-bit data is compressed to 6-bit data by seven steps, the error due to the compression/decompression of a value less than 64 is zero. Therefore, at the time of high sensitivity in which small data values form the majority or, in the case where pixel data values are small resulted from imaging dark portions at the time of low sensitivity, the compression method according to the basic configuration shown in FIG. 1 causes error least often.

As shown in FIG. 11, if the sensitivity is found to be high or the histogram is found to be tilted to dark portions after observing the sensitivity of the output data from the image sensor 60 or the distribution of brightness in the histogram of the image, the compression method of the basic configuration shown in FIG. 1 is applied.

If the sensitivity is not high or the histogram is not tilted to dark portions, an optimum compression method can be selected by arranging a mechanism for switching between processing methods to apply the third, fourth, or fifth embodiment.

(7) Seventh Embodiment

The following describes the seventh embodiment of the disclosure.

In this seventh embodiment, a compression processing section is incorporated in an image sensor and a decompression processing section of this seventh embodiment is installed on a data processing block of image sensor output. This configuration reduces the number of image sensor output bits, resulting in the reduced data transfer quantity per one frame.

According to the embodiments of the present disclosure described so far, the following effects are provided.

With the compression/decompression method according to the seventh embodiment, an compression error is small when data is small in quantity, namely, a dark portion of image causes a smaller compression error.

For example, the data outputted from the image sensor without being applied with a gain at the time of image taking with a high sensitivity is often small in value; with this data, a compression/decompression error is small and therefore it is difficult to see deterioration even in image.

Figure 12:
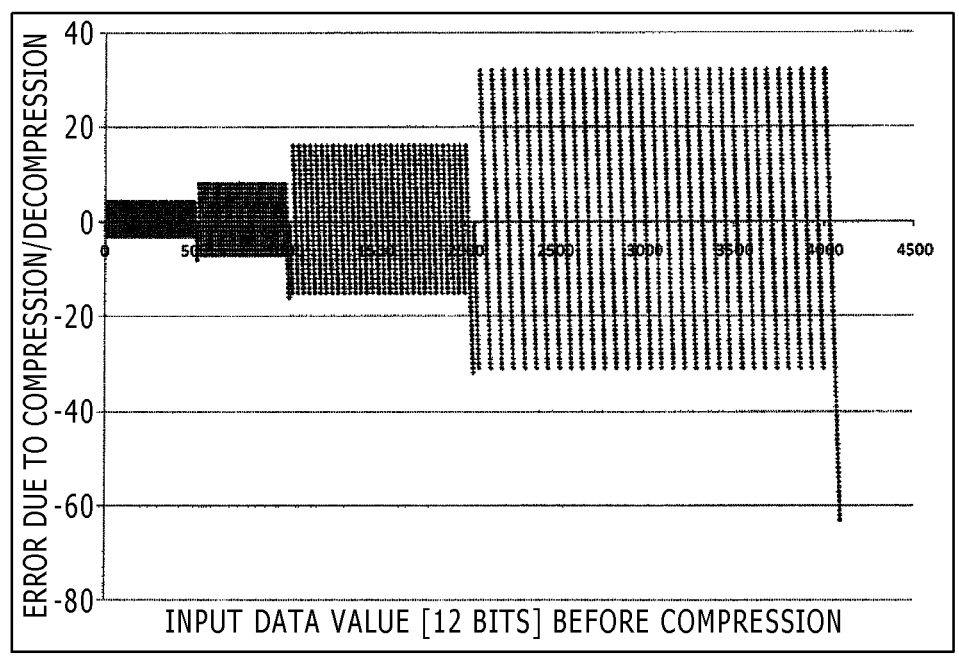
FIG. 12 is a diagram illustrating errors encountered in data compression/decompression processing.

Also at the image taking with a low sensitivity, if 12-bit raw data is compressed to 6-bit data, the number of steps of MSB bit position is four, and a bit reduction method is the rounding off a number to the nearest integer, then the errors caused by the compression/decompression processing are as shown in FIG. 12.

The error caused by the compression/decompression processing becomes larger as an image becomes brighter; it is about 31 at maximum except a portion of a very high level. The natural image data taken with the image sensor includes noise of a certain level even at the time of image taking with a low sensitivity; in processing such data into an image of a JPEG (Joint Photographic Experts Group) file for example, noise reduction processing is arranged in many cases.

The error quantity due to the compression/decompression processing is not largely different from the noise component quantity, so that applying noise reduction processing of correcting the error quantity due to the compression/decompression processing by determining this error quantity as a noise component allows the reduction of the error quantity to a level at which the noise quantity cannot be checked visually.

Figure 13:
FIG. 13 is an image illustrating one example of a raw image taken at 12-bit low-sensitivity.

The following fact was confirmed when a 12-bit raw image taken with a low sensitivity (FIG. 13) had been compressed to 6-bit data, the above-mentioned noise reduction had been applied to this 6-bit data, and an 8-bit bitmap image had been generated. Namely, it was confirmed that a comparison with an 8-bit bitmap image generated by processing the same raw data without compression indicates that PSNR (Peak Signal-to-Noise Ratio) is approximately 52 dB; likewise, in the bitmap of 5-bit compression/decompression processing, PSNR is approximately 48 dB.

Generally, if the PSNR value is 40 dB or higher, it is known that the difference cannot be visually checked.

In addition, the basic configuration of the above-mentioned embodiments has the processing of superimposing a random number at the time of decompression processing. The effects of this random-number superimposition processing are as follows.

In the basic configuration of the above-mentioned embodiments, the method based on the "bit reduction portion 332" shown in FIG. 1 also uses round down in addition to round off. In the case of round down, the processing of determining round off of a number to the nearest integer is not required, thereby simplifying the compressing processing. If the method based on the "bit reduction portion 332" shown in FIG. 1 is executed in round down, the error quantity is only a negative value, so that the data value after compression becomes smaller than the data value before compression.

The compression/decompression processing makes an image darker in its entirety. On the other hand, if a random number equivalent to the number of decompressed bits is superimposed on the data after decompression, the error quantity due to the compression/decompression processing spreads uniformly in both positive and negative directions, thereby preventing the image from getting darker.

Measuring averages of the error quantity resulted in approximately −21 in the case of the compression/decompression processing based on round down and approximately +0.3 in the case of attaching a random number at the time of decompression after the compression based on round down. In the case where the bit reduction based on round off to the nearest integer is executed the errors are distributed in both positive and negative directions, so that no darkened image will result at the cost of an increased quantity of the bit reduction processing.

It should be noted that the above-mentioned embodiments are applicable to image data of RGB and luminance and color difference type and audio data in addition to raw image data.

The data processing apparatuses practiced as the above-mentioned embodiments of the disclosure that provide the effects described above are applicable to the imaging devices of digital cameras and video cameras having solid-state imaging elements.

(8) Eighth Embodiment

Exemplary Configuration of a Camera System

Figure 14:
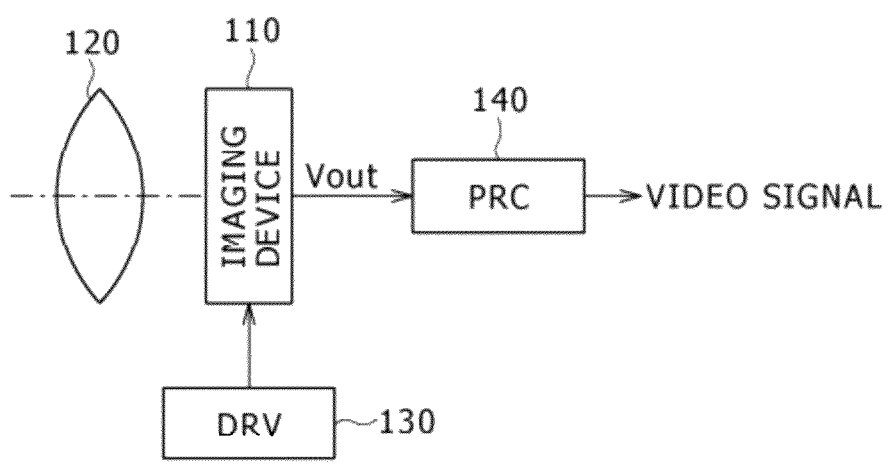
FIG. 14 is a schematic diagram illustrating an exemplary configuration of a camera system to which a data processing apparatus practiced as an eighth embodiment of the disclosure is applied.

Referring to FIG. 14, there is shown an exemplary configuration of a camera system to which a data processing apparatus practiced as the eighth embodiment of the disclosure is applied.

This camera system 100 has an imaging device 110 to which a solid-state imaging element, such as a CMOS (Complementary Metal-Oxide Semicoductor) sensor, is applicable as shown in FIG. 14.

The camera system 100 has a lens 120 for forming an incident light (or an image light) for example onto an imaging surface as an optical system that leads an incident light (forms an image of a subject) to a pixel area of the imaging device 110.

Further, the camera system 100 has a drive circuit (DRV) 130 for driving the imaging device 110 and a data processing apparatus (PRC) 140 for processing an output signal of the imaging device 110.

To this data processing apparatus 140, the data processing apparatus of each of the embodiments described above is applicable.

The drive circuit 130 has a timing generator (not shown) for generating various timing signals including a start pulse and a clock pulse for driving circuits inside the imaging device 110, thereby driving the imaging device 110 with a predetermined timing signal.

In addition, the data processing apparatus 140 executes predetermined signal processing on output signals of the imaging device 110. Specific description of the compression/decompression processing in this embodiment is skipped.

An image signal processed by the data processing apparatus 140 is recorded to a recording media, such as a memory. The image information recorded to a recording media is printed as hardcopy with a printer for example. Further, image signals processed by the data processing apparatus 140 are displayed on a monitor based on a liquid crystal display for example as moving images.

As described above, installing the data processing apparatus associated with this embodiment on imaging apparatuses such as digital still cameras for example can realize precision cameras that minimizes the deterioration in image quality while minimizing the increase in processing time and circuit scale.

While preferred embodiments of the present disclosure have been described using specific terms, such description is for illustrative purpose only, and it is to be understood that changes and variations may be made without departing from the spirit or scope of the following claims.

Each of the methods described above in detail can be formed as a computer program in accordance with the processing procedures described above that is executed by a computer or a CPU (Central Processing Unit) used therein.

The above-mentioned program can be configured such that a recording media like a semiconductor memory, a magnetic disk, an optical disk, or a floppy disk (trademark), for example, to which this software is recorded is loaded on a computer and the loaded recording media is accessed by the computer for execution of the software.

The present disclosure contains subject matter related to that disclosed in Japanese Priority Patent Application JP 2011-083811 filed in the Japan Patent Office on Apr. 5, 2011, the entire content of which is hereby incorporated by reference.

What is claimed is:

1. A data processing apparatus comprising:
   a data sort block configured to sort, into multiple groups by information data of a same type, input data including information data of multiple types formed by multiple bits;
   a maximum value extraction block configured to extract a maximum value of said information data in each of said groups sorted by said data sort block;
   a bit position decision and bit reduction block configured to determine a reduction position of bits common to the information data of the same type in each group on the basis of said maximum value extracted by said maximum value extraction block and reduce said common bits in accordance with the determination;
   a most-significant-bit positional information output block configured to output most-significant-bit positional information indicative of a most significant setting bit position in information data indicative of said maximum value extracted by said maximum value extraction block; and
   a bit attachment/decompression block configured to determine a quantity of bits to be attached on the basis of said most-significant-bit positional information from said most-significant-bit positional information output block and attach bits to output data of said bit position decision and bit reduction block in accordance with said determination.

2. The data processing apparatus according to claim 1, wherein
   said bit position decision and bit reduction block reduces a bit higher than a most significant setting bit in information data indicative of said maximum value in said information data of a same type in said each group.

3. The data processing apparatus according to claim 2, wherein
   said bit position decision and bit reduction block executes bit reduction starting from a least significant bit subsequent to a bit higher than the most significant setting bit toward a most significant bit in a bit array in information data indicative of said maximum value in said information data of a same type in said each group.

4. The data processing apparatus according to claim 1, wherein said bit attachment/decompression block attaches a random number when bits are attached for decompression.

5. The data processing apparatus according to claim 4, wherein,
   in attaching a random number, said bit attachment/decompression block attaches said most-significant-bit positional information from said most-significant-bit positional information output block.

6. The data processing apparatus according to claim 1, further comprising:
   a differential value acquisition block configured to receive said input data, obtain a differential value between information data adjacent to each other in said each group, obtain a code and an absolute value of the obtained differential value, supply the differential absolute value including the obtained code to said data sort block, and output reference data associated with said input data to said bit attachment/decompression block; and
   a differential value adding block configured to execute data restoration in accordance with decompressed differential value data and code outputted from said bit attachment/decompression block and said reference data, wherein said maximum value extraction block and said bit position decision and bit reduction block execute maximum value extraction and bit position decision and bit reduction processing on said absolute differential value, said most-significant-bit positional information output block outputs a value of each start information data of said each group and said code to said bit attachment/decompression block, and said bit attachment/decompression block obtains differential value data decompressed by bit attachment and outputs said decompressed differential value data and said code to said differential value adding block.

7. The data processing apparatus according to claim 6, wherein said differential value adding block executes data restoration by restoring information data adjacent to reference data in a same group of the reference data by use of the reference data, first differential value data, and code information and repeating substantially a same computation by use of differential value data between thus restored information data and information data adjacent to the restored information data in the group and code information.

8. The data processing apparatus according to claim 1, further comprising: an input section configured to reduce bits of least significant bit side of input data in association with a first monotonously increasing function and supply the reduced input data to said data sort block; and a processing block configured to restore bits of least significant bit side of output data from said bit attachment/decompression block in association with a second monotonously increasing function.

9. The data processing apparatus according to claim 8, further comprising:

an acquisition block configured to acquire at least one of image brightness distribution information and image brightness sensitivity information, wherein said input data is raw data of an image;

if one of the acquired brightness distribution and brightness sensitivity is darker than a preset reference value, said input section supplies said input data to said data sort block without executing reduction processing on said bits of least significant bit side, and said processing block does not execute restoration processing on said bits of least significant bit side for the output data of said bit attachment/decompression block; and if one of the acquired brightness distribution and brightness sensitivity is brighter than a preset reference value, said input section supplies the input data on which reduction processing of said bits of least significant bit side was executed to said data sort block, and said processing block executes restoration processing on the bits of the least significant bit side for the output data of said bit attachment/decompression block.

10. The data processing apparatus according to claim 1, further comprising: an input section configured to reduce bits of least significant bit side of input data in association with pattern dither; and a processing block configured to decompress bits of least significant bit side of output data from said bit attachment/decompression block by the number of bits reduced by said pattern dither.

11. The data processing apparatus according to claim 10, further comprising an acquisition block configured to acquire at least one of image brightness distribution information and image brightness sensitivity information, wherein said input data is raw data of an image;

if one of the acquired brightness distribution and brightness sensitivity is darker than a preset reference value, said input section supplies said input data to said data sort block without executing reduction processing on said bits of least significant bit side, and said processing block does not execute restoration processing on said bits of least significant bit side for the output data of said bit attachment/decompression block; and if one of the acquired brightness distribution and brightness sensitivity is brighter than a preset reference value, said input section supplies the input data on which reduction processing of said bits of least significant bit side was executed to said data sort block, and said processing block executes restoration processing on the bits of the least significant bit side for the output data of said bit attachment/decompression block.

12. The data processing apparatus according to claim 1, further comprising: an input section configured to add a random value to the least significant bit side of input data, delete the number of bits of a maximum value of a value range of random number values from the least significant bit side of input data, and supply the resultant input data to said data sort block; and a processing block configured to decompress bits on the least significant bit side of the output data of said bit attachment/decompression block by the number of bits deleted by the input section.

13. The data processing apparatus according to claim 12, further comprising an acquisition block configured to acquire at least one of image brightness distribution information and image brightness sensitivity information, wherein said input data is raw data of an image;

if one of the acquired brightness distribution and brightness sensitivity is darker than a preset reference value, said input section supplies said input data to said data sort block without executing reduction processing on said bits of least significant bit side, and said processing block does not execute restoration processing on said bits of least significant bit side for the output data of said bit attachment/decompression block; and if one of the acquired brightness distribution and brightness sensitivity is brighter than a preset reference value, said input section supplies the input data on which reduction processing of said bits of least significant bit side was executed to said data sort block, and said processing block executes restoration processing on the bits of the least significant bit side for the output data of said bit attachment/decompression block.

14. A data processing method comprising:

sorting by a data processing apparatus, into multiple groups by information data of a same type, input data including information data of multiple types formed by multiple bits;

extracting by the data processing apparatus a maximum value of said information data in each of said groups sorted in the data sorting;

determining by the data processing apparatus a reduction position of bits common to the information data of the same type in each group on the basis of said maximum value extracted in the maximum value extraction and reducing said common bits in accordance with the determination;

outputting most-significant-bit positional information indicative of a most significant setting bit position in information data indicative of said maximum value extracted in the maximum value extraction; and determining a quantity of bits to be attached on the basis of said most-significant-bit positional information and attaching bits to output data from which common bits have been reduced in accordance with said determination.

15. The data processing method according to claim 14, wherein, in said bit reduction position determination and bit reduction, in information data of a same type within said each group, bit reduction is executed from a bit higher than a most significant setting bit toward a most significant bit and then from the least significant bit to higher bits in a bit array in the information data indicative of said maximum value.

16. A camera system comprising:

an optical system;

an imaging device configured to image a subject image passing through said optical system and output raw data; and a data processing apparatus configured to process said raw data, wherein said data processing apparatus has a data sort block configured to sort, into multiple groups by information data of a same type, input raw data including color information data of multiple types formed by multiple bits, a maximum value extraction block configured to extract a maximum value of said color information data in each of said groups sorted by said data sort block, a bit position decision and bit reduction block configured to determine a reduction position of bits common to the color information data of the same type in each group on the basis of said maximum value extracted by said maximum value extraction block and reduce said common bits in accordance with the determination;

a most-significant-bit positional information output block configured to output most-significant-bit positional information indicative of a most significant setting bit position in information data indicative of said maximum value extracted by said maximum value extraction block; and a bit attachment/decompression block configured to determine a quantity of bits to be attached on the basis of said most-significant-bit positional information from said most-significant-bit positional information output block and attach bits to output data of said bit position decision and bit reduction block in accordance with said determination.

* * * * *